United States Patent

Gammel

[11] 4,223,312
[45] Sep. 16, 1980

[54] DIRECTIVE RADIO COMMUNICATION TRANSMISSION SYSTEM FOR MAINTAINING THE ALIGNMENT OF TRANSMISSION AND RECEIVER ANTENNA

[75] Inventor: Josef Gammel, Munich, Fed. Rep. of Germany

[73] Assignee: Siemens Aktiengesellschaft, Berlin & Munich, Fed. Rep. of Germany

[21] Appl. No.: 902,167

[22] Filed: May 2, 1978

[30] Foreign Application Priority Data

May 27, 1977 [DE] Fed. Rep. of Germany ....... 2724198

[51] Int. Cl.² .............................................. G01S 5/02
[52] U.S. Cl. .............................................. 343/117 R
[58] Field of Search ...................... 343/100 CS, 117 R

[56] References Cited

U.S. PATENT DOCUMENTS

| | | | |
|---|---|---|---|
| 2,677,822 | 5/1954 | Perilhou | 343/100 CS X |
| 3,760,420 | 9/1973 | Hadad et al. | 343/117 R |
| 4,150,379 | 4/1979 | Connors | 343/117 R X |

*Primary Examiner*—Theodore M. Blum
*Attorney, Agent, or Firm*—Hill, Van Santen, Steadman, Chiara & Simpson

[57] ABSTRACT

A directive radio communication transmission system in which the radiation between the receiver and transmitting antenna is automatically and continuously changed in direction by causing the antenna pattern to vary in the vertical direction from a reference beam direction and in small angular adjustments relative to the half-power beam width.

3 Claims, 8 Drawing Figures

DIRECTIVE RADIO COMMUNICATION TRANSMISSION SYSTEM FOR MAINTAINING THE ALIGNMENT OF TRANSMISSION AND RECEIVER ANTENNA

BACKGROUND OF THE INVENTION

1. Field of the Invention

This invention relates in general to radio communication using directive transmitting and receiving antenna.

2. Description of the Prior Art

German Offenlegungsschrift No. 26 06 760 discloses a system which uses a comparison of error frequency of a test signal.

SUMMARY OF THE INVENTION

The present invention has the underlying object to improve an antenna alignment and automatic tracking system between receiving and transmitting signals wherein the optimum signal transmission particularly with multi-path influences and with digital signal transmission is accomplished.

In the invention, signals are evaluated which have been subjected to multi-path influences by determining the eye-opening or character distortion which exists.

It is advantageous to change the directive characteristics in a specific chronological sequence, for example, by slowly changing them in sine or sawtooth shaped fashion and then determining the eye-opening fluctuations or character distortion at the receiver and thereafter making optimum antenna adjustments.

During daytime, relatively great fluctuations of the radio field attenuation occurs in directive radio communication transmission systems as is described in the following publications. For example, in "Wave Propagation I" by Jurgen Grosskopf and particularly pages 154 and 155 of this publication. "Planning and Computation of Direction Radio Connections" by H. Brodhage and W. Hormuth, Image Setups 15 and 16. A visual connection with a first free fresnel zone exists between transmission and receiver antennas 1 and 2 illustrated in FIG. 6. Fluctuations of the beam 6 occur of more than 30dB as shown by drawings 2 through 6 in the book "Planning and Computation of Direction Radio Connections" referenced above and these can be seen from the illustration of the experimental tests. The fading-dependent radio field attenuation increases as can be concluded from these illustrations and depends upon the necessary available time of the radio path and also depends upon the radio frequency range.

Some fluctuations are therefore very short and others depend upon the particular time of day. Thus, for example, the field intensity is considerably greater in the early morning than in the afternoon hours when possible solar radiation occurs. These fadings for the greatest part can be explained due to the fact that the dielectric constant of air does not remain constant and it either increases rapidly or decreases rapidly toward the ground. As is known and shown in FIG. 6 of the above reference, the electromagnetic wave is broken either toward the surface of the ground 11 3 or away from it 5 and coupling losses and fading occurs in the radio field particularly in heavily wrapped antenna and the preferred direction of the antenna diagram 10 is no longer optimally aligned with the direction of path of the electromagnetic wave from the receiver to the transmitter under the above conditions.

In analog transmissions systems known up to this time, the difficulties illustrated above are compensated for in that the transmission output is increased and if necessary frequency and space diversity equipment is provided.

Experiments show that fading can be considerably reduced (less than 10 dB) if the reflected angle of the antenna diagram 8 is adjusted to the climatologically altered propagation conditions and thus the directional characteristic is always aligned to the path electromagnetic wave takes for example 5 of the directional antenna.

German Offenlegungsschrift No. 26 06 760 describes that the antenna directions are to be adjusted according to the smallest radio field attenuation. This document also points out that it is advantageous to adjust the antenna directions according with the smallest intermodulation during the transmission of analog signals particularly of multi-channel carrier frequency signals. The field intensity criteria can therefore be determined from the pilot signal itself and from its harmonics by determining the intermodulation products and subsequently the optimum antenna setting can be achieved. For transmitting information in digital form, a comparison of the error frequency of a test program assigned to the signal is accomplished in various beam directions for the two antenna and subsequently the optimum transmission is determined by setting the antenna to the optimum directions.

When FDM (frequency division modulation) signals are transmitted by radio, the above mentioned radio field attenuation increases normally by the increase of path and intermodulation noise as the transmission output is greatly attenuated. However, in TDM (time division modulation) signal transmission, in conjunction with the increase of the radio field attenuation, a distortion of the TDM communication spectrum occurs such that the regeneration of the TDM signals at the receiver becomes no longer possible. Thus, for TDM signal transmissions fading similar to those in FDM operation lead to the breakdown of the TDM signal transmission by way of radio waves and the error rate in the magnitude of up to 50% in the radio field pattern where fadings increase which are caused by noise that at times can be very powerful during the FDM signal transmissions. The cause for such breakdown is to be observed in that signals which reach the receiver from the transmitter by way of various paths tend to cancel and destruct at least portions of the communication spectrum.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
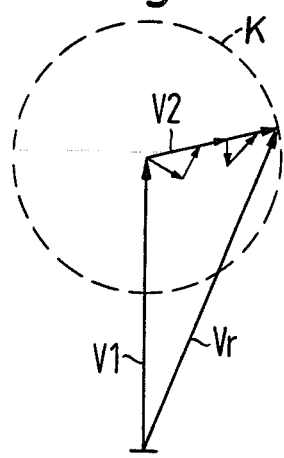
FIG. 1 is a diagram illustrating signal interference in a transmission medium.
Figure 2:
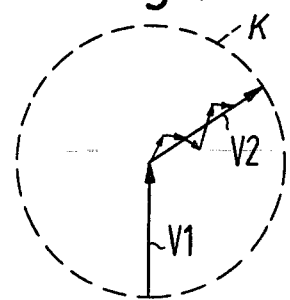
FIG. 2 is a diagram illustrating interference in a transmission medium.
Figure 3:
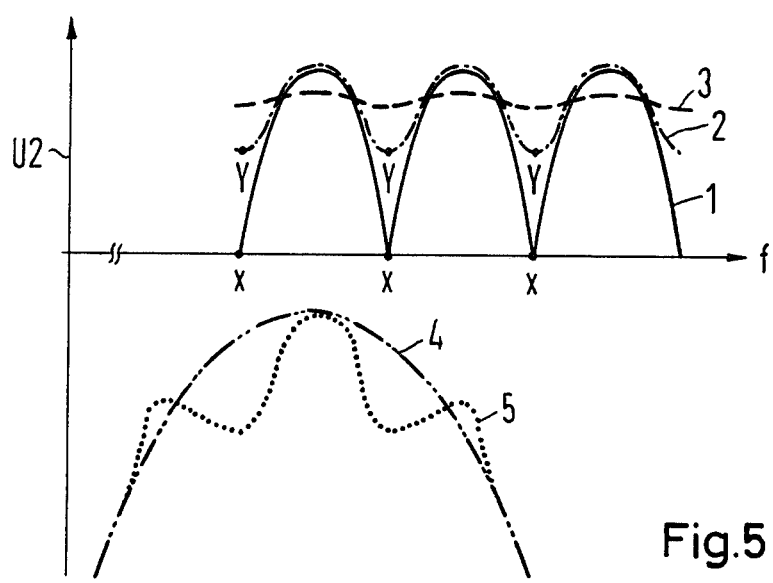
FIG. 3 is a plot of signals in a transmission medium.

FIGS. 1 through 3 illustrate destructive interference between various signals in various communication paths.

Figure 6:
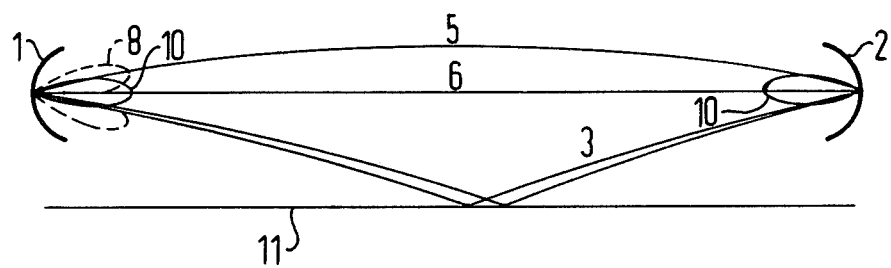
FIG. 6 illustrates transmitting and receiving antenna and various signal paths therebetween.

FIG. 1 illustrates the normal case of reflection at various small angles, for example, as shown by the beam 3 in FIG. 6 of the electromagnetic waves at the ground or on reflection layers in the transmission media. The vector VI corresponds with the main beam between the reflectors, in other words, corresponds to the center of the beam lobe. The vector V2 is a sum vector and as illustrated comprises various side beams of the antenna radiated diagram on the transmitter and of the receiver diagram. The vector $V_r$ is the sum of vectors V1 and V2. As the vectors which form the vector V2 can be differently comprised the end of vector V2 moves on a circle K as indicated in dash line.

FIG. 2 illustrates a different case in which the vectors V1 and V2 have the same size. As vector V2 again moves in a circle K as, for example, assumed here total erasure of the signal can occur depending upon the frequency and reflection as can be observed.

These processes are illustrated in FIG. 3 in diagram form. In the upper portion of FIG. 3 the receiver voltage U2 is plotted as an ordinate and frequency is plotted as the abscissa. Curve 1 illustrates the case in which the total erasure takes place at the points x. If the transmission frequency band as shown below in curve 4 extends across such erasure point distortions occur in the modulation spectrum. Curve 2 comprising dash dots illustrates the case in which a total erasure does not take place due to the positions of the vectors as illustrated in FIG. 1. Maxima and minima will occur and the minima are referenced by the y. In this case, the RF modulation spectrum in the receiver input will be distorted so that curve 4 is changed to dotted curve 5 in the lower portion of FIG. 3. Such distortion leads to considerable character distortions particularly when digital signals are being utilized.

By flattening the transmission characteristic between the two antenna such that only a slight or no variations occur as illustrated by the dashed curve 3 which can be accomplished by adjusting the antennas such signal distortions will be eliminated. So as to eliminate self-cancellation mentioned above, the specific alignment of the antenna can be adjusted to remove this undesirable feature.

Figure 4:
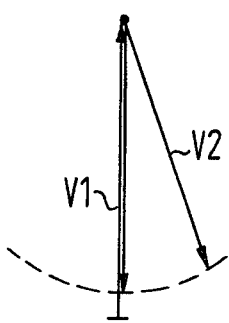
FIG. 4 is a plot of some vectors from a transmitting and receiving system.
Figure 5:
FIG. 5 is a diagram illustrating vectors of signals in a transmitting system.

When considering the sum vectors, an additional explanation is desirable. If distortions occur in the signal spectrum due to vectorial substraction such as illustrated as x and y in FIG. 3, such distortions can be proportionally reduced when from the relatively large signals which form the differential product only one in relation to the other is slightly decreased. This is illustrated in FIGS. 4 and 5. From FIG. 5 it can be observed that when the vector V1 is only slightly larger than vector V2 a considerable decrease in the distortions is obtained as illustrated in FIG. 3 relative to the case in which the two vectors are almost the same in magnitude. R represents the residual amplitude at the substraction points and thus is a measure for the occurring distortions.

In contrast to the FDM signal transmission (not considering the pilot signals) it is possible in the TDM signal transmission to precisely determine the quality of reception of the communication, in other words, to recognize whether particular multi-path influences are present in the radio field. Thus, it is possible with the aid of quality supervision equipment which will be subsequently more precisely described to determine the quality deterioration of the receiver signals even before errors occur in the regeneration of the signals. The signal distortions subject to the multi-path phenomena can thereby be influenced by an alteration of the radiated characteristics of the transmission and receiver antenna. This phenomena gives rise to the possiblility for counter-acting the self-cancellation of the signals which reach the receiver location to be corrected by adding several of the signals from various paths if the transmission and receiver characteristic of the antenna is altered according to the quality characteristics of the received signals.

The quality of the received signal after it has been modulated is commonly defined by the size of the "eye-opening", in other words, the quality of a TDM signal becomes poorer in quality for smaller eye-openings. Thus, when the eye-opening has already been reduced during transmission by means of an interference process errors in the regeneration of the received signal will occur. On the other hand, as the size of the eye opening becomes larger, the quality of the transmitted signal becomes better.

The magnitude of the signal distortion will depend upon the antenna adjustment at any time when a multi-path defect occurs according to the above discussion. Thus the influence of the direction of radiation at the transmitter is the same as at the receiver site. If the directional characteristics of the receiver antenna is slightly changed depending upon a sinusoidal or sawtooth-shaped control voltage for example, the signal distortion of the signal received will change in the same manner in synchronism with this alteration and in other words, the eye opening of the digital signal received will fluctuate in the same manner and, thus, will supply a signal for readjusting the direction of the receiver antenna.

Figure 7:
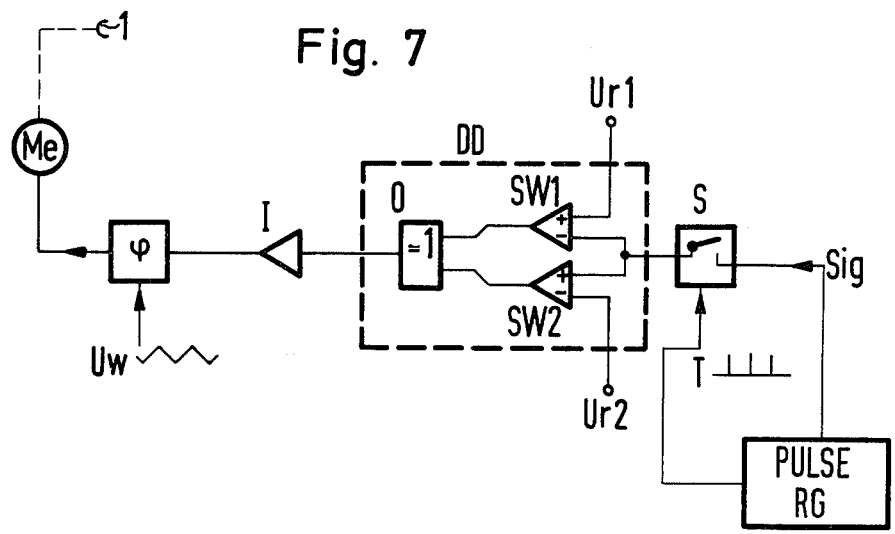
FIG. 7 is a block diagram of the invention.

FIG. 7 illustrates an electrical schematic diagram for determining the amount of eye opening. The signal Sig arriving at the receiver site is supplied to the input of a switch S and the signal is scanned in the center of a bit to be expected at the rhythm of the bit frequency with a switch S which is controlled by a pulse train T. The pulse train T is derived from the incoming signal by means of a pulse regeneration circuit RG which supplies the pulse train T. A double window discriminator DD receives the output of the switch S and includes two threshold value circuits SW1 and SW2 and these circuits provide a pair of outputs which are supplied as inputs to the OR gate O. The output of the OR gate O represents the output of the double window discriminator DD which is supplied to the input of an integrator I. A phase discriminator $\phi$ receives the output of the integrator I and also receives a triangular wobble voltage Uw which is supplied to the second input of the phase discriminator $\phi$. The control signal comprises the output of the phase discriminator $\phi$ which is supplied to the control input of the drive motor Me which controls the elevation axis of the directional antenna 1.

Figure 8:
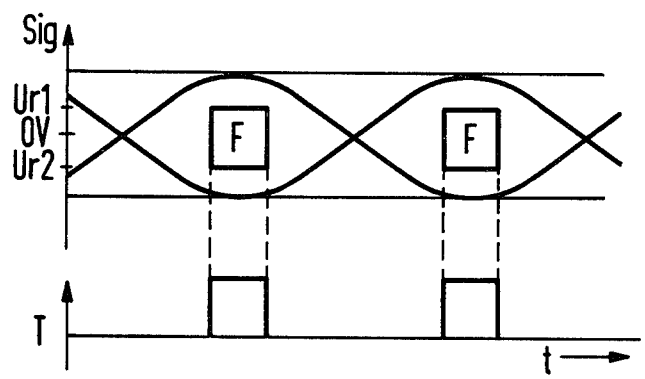
FIG. 8 is a plot of eye patterns of a signal received and pulses plotted against time.

The threshold value circuits SW1 and SW2 of the double window discriminator DD respectively receives second inputs which comprise the reference voltages Ur1 and Ur2 which control and determine the thresholds of the threshold value circuits and thus determine the amplitude reference for the time windows called for by the timing pulses T illustrated in FIG. 8.

In FIG. 8, the eye pattern of the signal SIG and the pulse train T is plotted above the lower curve in FIG. 8. The time windows F respectively comprise a rectangular area in the center of the "eye-openings". As long as signal occurs within the time windows F the integrator I at the output of the OR gate O will also not receive any input. If on the other hand voltages occur within the time windows in the amplitude frame provided by the reference voltages Ur1 and Ur2 these voltages will be passed to the integrator I in the form of impulses and an error voltage will be produced which is supplied as an input to the phase discriminator $\phi$. The phase discriminator produces a directional dependent control magnitude voltage from this error signal depending upon the wobble voltage Uw supplied to its second input and said control magnitude adjusts the central elevation angle of the antenna depending upon its wobble movement by way of its drive motor such that the error voltage is reduced to a minimum at the output of the integrator I. The wobble voltage Uw in the circuit disclosed according to FIG. 7 is simultaneously superimposed on the conventional control signal for the drive motor of the antenna in the elevation axis and thus represents the alternating magnitude signal which is required so as to slightly move the antenna wobble about the elevation axis along the lines for a search operation for a continuous determination of the optimum conditions. The results are that continually the antennas 1 and 2 in FIG. 6 will be maintained for optimum transmission of signals.

Although the invention has been described with respect to preferred embodiments, it is not to be so limited as changes and modifications can be made which are within the full intended scope of the invention as defined by the appended claims.

I claim as my invention:

1. A directive radio communication transmission system having directive transmitting and receiving antennas in which the radiating direction of the receiving and transmitting antennas are automatically and continuously altered by repetitively shifting the antenna pattern primarily in the vertical direction from the initial beam direction, in small angles in comparison to the half-power width of the beam and in which the maximum antenna response occurs in various beam directions of the two antennas with the smallest error frequency when transmitting digital form communication determined by comparing the error frequency of a test level allocated to the signal, and wherein the evaluation of the signals is accomplished by determining the eye-opening or character distortion under multipath influences.

2. A directive radio communication transmission system according to claim 1, wherein the directive characteristic of the antennas is slowly altered in a specific chronological sequence, for example, in sine- or saw-tooth fashion and the eye-opening fluctuation or character distortion, respectively, is observed at the receiver site and the optimum antenna adjustments are accomplished using the resulting signals.

3. A circuit for correcting the tracking of an antenna by direction changing means adapted to receive energy comprising, a switch receiving incoming energy from said antenna and opened and closed in a periodic manner, a pair of threshold value circuits receiving the output of said switch at first inputs, a pair of reference voltages supplied to second inputs of said pair of threshold value circuits, said pair of reference voltages comprising 180 degrees out of phase sine wave shaped voltages, an OR gate receiving the outputs of said pair of threshold value circuits, and integrator receiving the outputs of said OR gate, a phase discriminator receiving the output of said integrator and a wobble voltage at a second input, and said antenna direction changing means receiving the output of said phase discriminator and connected to said antenna to control its angular position.

* * * * *